United States Patent [19]

Harman

[11] 4,288,214
[45] Sep. 8, 1981

[54] ARRANGEMENTS FOR FEEDING FLUIDIZING GAS TO A FLUIDIZED BED COMBUSTION APPARATUS

[75] Inventor: Maurice Harman, Milton Keynes, England

[73] Assignee: The Energy Equipment Company Limited, Olney, England

[21] Appl. No.: 109,635

[22] Filed: Jan. 4, 1980

[30] Foreign Application Priority Data

Jan. 10, 1979 [GB] United Kingdom ............... 00928/79

[51] Int. Cl.³ ...................... F27B 15/00; F26B 17/00; F27D 1/12
[52] U.S. Cl. ..................................... 432/58; 34/57 R; 122/44 R; 432/233; 432/238

[58] Field of Search ............... 432/58, 233, 238; 34/57 A, 57 R; 122/44 R

[56] References Cited

U.S. PATENT DOCUMENTS 3,605,276  9/1971  Enders .................... 34/57 A
3,858,861  1/1975  Jernigan ................. 432/238

Primary Examiner—John J. Camby

[57] ABSTRACT

Fluidizing gas supply pipes are passed through a wall of a fluidized bed container. The outermost end of the gas supply pipe is welded to a tube plate and the tube plate is in turn cooled by a coolant flowing thereagainst through tubes welded to the surface of the tube plate or the tube plate is spaced from the wall of the container to form a water jacket through which the coolant fluid is arranged to flow.

10 Claims, 3 Drawing Figures

ARRANGEMENTS FOR FEEDING FLUIDIZING GAS TO A FLUIDIZED BED COMBUSTION APPARATUS

DESCRIPTION

The present invention relates to arrangements for feeding fluidising gas to fluidised beds in fluidised bed combustion apparatus.

A fluidised bed normally comprises a bed of inert particulate material (for example sand) which in operation is fluidised by air or an inert gas passing through the bed material. The fluidising gas may with advantage be introduced to the bed material via an array of supply tubes arranged to extend vertically through the bed material from a bottom wall of the bed container or to extend horizontally into the bed material from a side wall of the apparatus.

Fluidised bed apparatus (for example incinerators, hot gas generators, producer gas generators, heat treatment furnaces, reactors, driers, calciners and others) need to be provided with a suitable container for the inert particulate material forming the fluidised bed. In most cases such containers are formed of refractory materials (such as refractory bricks) retained within a steel structure.

The material forming the bed in the fluidised bed apparatus used for the combustion of fuels, is normally at an elevated temperature and (due to the dense nature of the inert particulate material used to form the fluidised bed) offers a high resistance to gas flow therethrough. As a result the gas pressure at the base of a fluidised bed combustion apparatus tends to be high (of the order of 500 mm of water). This combination of high temperatures and pressure creates a sealing problem at the point of gas entry to the fluidised bed container which may prove troublesome when using conventional sealing techniques such as gaskets, sealing ropes and/or glands. These problems are aggreviated when the fluidising gas is distributed within the fluidised bed by means of supply tubes extending through the bed material; particularly if the fluidising gas passed to the bed material is at an elevated temperature (of the order say of 600° to 1000° C.) which happens when the bed is, for example, being run-up to an operating temperature at which stable, autothermic, operation of the apparatus can take place.

When using horizontally extending supply tubes the effects of high temperature gases and high pressures present considerable problems at the points where the or each supply tube joins the container wall or walls and difficulty is often experienced in preventing leakage of gas (rather than a flow of gas into the supply tubes). At the same time heating of the container wall may cause distortion of that wall with the result that heat loss may become a serious problem.

According to the present invention there is provided an arrangement for feeding fluidising gas to a fluidised bed in a fluidised bed combustion apparatus via supply tubes in which the outermost end of the or each said supply tube is fixed to a wall of the container of the fluidised bed and in which that portion of the wall adjacent the end of the or each supply tube is cooled by a liquid coolant. Preferably the coolant is water.

Described embodiments of the invention provide that the end of the or each supply tube passes through and is welded to a tube plate, which tube plate is welded to the wall of the container, and that the tube plate is cooled by flow of liquid coolant there against.

The arrangement may include pre-heat means operable to pre-heat fluidising gas passed to said supply tubes and flow switch means for monitoring the flow rate of liquid coolant to said arrangement, said flow switch means being operable to prevent operation of said pre-heat means when the flow of coolant falls below a predetermined flow rate.

Preferably there is provided a thermostatically controlled valve operable to control the rate of coolant flow to the arrangement to maintain the temperature of the coolant issuing from said arrangement below a predetermined temperature.

A bypass valve may be interconnected between a fluid coolant inlet and a fluid coolant outlet of the apparatus, which valve is operable to maintain a minimum coolant flow rate from the apparatus.

The coolant may flow along tubes welded to the surface of said tube plate; which tubes are, with advantage, semi-circular in section and welded to the tube plate adjacent the end of the or each supply tube.

An alternative arrangement provides a second tube plate welded to said supply tubes spaced from said first tube plate, liquid coolant being constrained to pass between said first and second tube plates around the end of the or each said supply tube. Preferably the end portion of the or each supply tube is surrounded by metal rings welded to said first and second tube plates and acting to space said first and second tube plates apart.

As the period in which fluidising gases are passed to the fluidised bed are heated may be limited (to the time needed to raise the temperature of the bed material to the temperature at which combustion of fuel fed to the bed is supported) cooling of the ends of the supply tubes may need not be effected for lengthy periods of time.

The tube plate to which the supply tubes are preferably welded is desirably of substantial thickness (1 cm or more) and of material having similar thermal characteristics to that of the supply tubes (advantageously the welding techniques used are similar to those recommended by The British Standards Authority for welding fire tubes into tube plates British Standard. The welds between the supply tubes and tube plate may advantageously be undercut filled welds. The welds are preferably accessable during and after assembly of the fluidised bed container and of the supply tubes, to enable their inspection and replacement.

The water inlets are provided near the bottom and the water outlets near the top of the arrangement. Water used for cooling the ends of the supply tubes may be either treated feed water which is returned to a hotwell, or untreated water running to a drain. It is estimated that the quantity of water required will be modest if used solely for a limited period, for example when heated gases passing from a pre-heater burner are being passed to the supply tubes to warm up the bed prior to its autothermic operation; but the use of recirculated, treated, feed-water would prevent both loss of heat and of water.

The same method of cooling may be applied to the use of vertical supply tubes with bubble caps to cool the bottom plate of the fluidised bed combustion apparatus and to horizontally extending supply tubes entering a side wall of the container, and to this extend make it possible to use pre-heaters in such arrangements.

The incorporation of flow-switches monitoring the flow of cooling water which should be maintained at a setting above the specified minimum of the switches to interlock with the circuit of the fluidising gas pre-heaters so that the pre-heaters cannot be started in the absence of cooling-water flow ensure safe operation of the welded joints between the supply tubes and the tube plate. The thermostatically controlled valves operate to vary the flow of water at the inlet to maintain a constant outlet temperature (of about 60° C.) as is required by most local authority by-laws. The by-pass valve is preferably provided to maintain a minimum coolant flow rate so as to maintain the flow-switch closed.

Embodiments of the invention will now be described with reference to the accompanying drawings in which.

Figure 1:
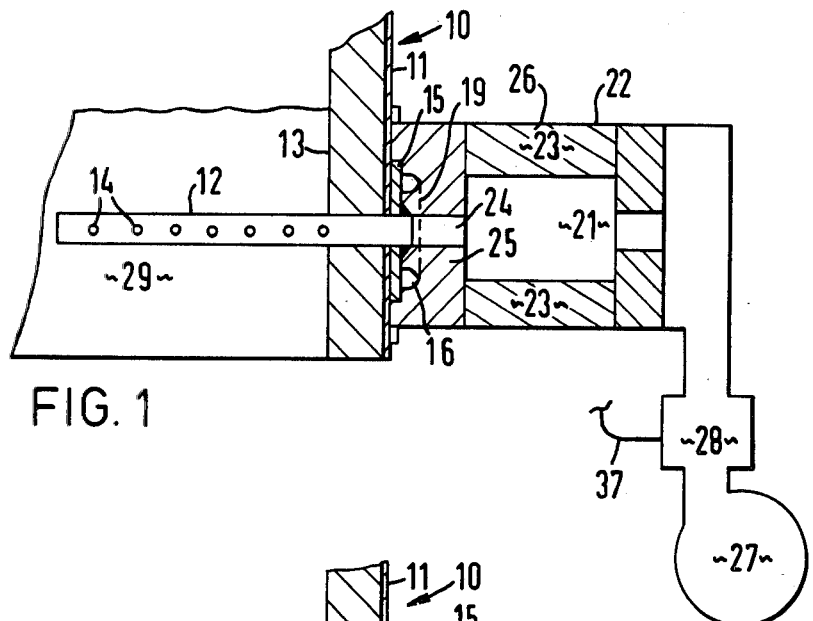
FIG. 1 is a schematic sectional side elevation of part of a fluidised bed combustion apparatus embodying the invention.

FIG. 1 shows a fluidised bed container 10 of steel a wall 11 of which is penetrated by a plurality of horizontally extending sparge-tubes 12 which also pass through a lining of refractory bricks 13 within the walls of the container 10. Each sparge-tube 12 is provided with a plurality of apertures 14 as shown. The apertures extend generally horizontally or outwardly and downwardly of the tubes 12. The outermost end of each sparge-tube 12 (that end of each sparge-tube 12 passing through the wall 11 of the container 10) passes through and is welded to a tube plate 15 which carries half-round water tubes 16 extending the length of the container 10.

One end of the lower tube 16 forms a coolant inlet 17 and the corresponding end of the upper tube 16 forms a coolant outlet 18 (refer to FIG. 3) by which coolant is passed to the tubes 16. The other ends of the tubes 16 are interconnected at 19.

The outermost ends of the sparge-tubes 12 are welded to the tube plate 15 making use of undercut welds as recommended by The British Standards Authority for fire tubes into the tube plates (British Standard). The tube plate 15 is welded or flanged at 20 to the side of the container 10.

A plenum chamber 21 formed of an outer steel casing 22 and lined with refractory material 23 supplies gases, combustion air and recycled flue gas to the sparge-tubes 12 and, as shown, terminates in channels 24 passing through refractory blocks 25 leading to the ends of the sparge tubes 12. The plenum chamber 21 has a cover 26 which is removable to enable access to the blocks 25 and the blocks 25 may themselves be removed to enable access to the welds between the tube plate 15 and the sparge-tubes 12 thereby enabling inspection and/or replacement of the welded joint or of the tubes.

Gases passed to the plenum chamber 21 from gas inlet means 27 (for example a Rootes type blower) may be pre-heated in a burner 28 to raise the temperature of the bed 29 to its operating temperature.

It will be seen from FIG. 1 that the wall 11 of container 10 forms a diaphram between the fluidised bed 29 and the plenum chamber 21 so that a flow may be established solely through the sparge-tubes 12. It will also be seen that convective heating of the sparge-tubes 12 caused by the passage of hot gases therethrough, from the burner 28 is balanced by the conduction of heat away from the sparge-tubes 12 via the tube plate 15 and the water cooled areas of the tube plate adjacent the half-round pipes 16.

The rate of convective heat supply from the gas to the sparge-tubes is a function of the temperature difference therebetween, the heat transfer coefficient and the wall area of the sparge tubes; the rate of conductive heat transfer from the tubes 12 to the plate 15 and to the cooling water is determined by the temperature difference between the various elements in the system, the cross-sectional area of the sparge-tube walls, the coefficient of conduction of the tube material and the distance between the heated parts of the tubes and the tube plate 15. With these considerations it is possible to calculate the cooled length of the sparge-tubes 12 and the rate of heat loss to water, the former of the order of a few centimeters and the latter requiring about 50 liters per hour for each sparge-tube 12 if the diameter of the sparge tube is about 90 mm and the wall thickness is about 3 mm and with a gas temperature of approximately 850° C. and raising water temperature from approximately 50° C. to 60° C.

Figure 2:
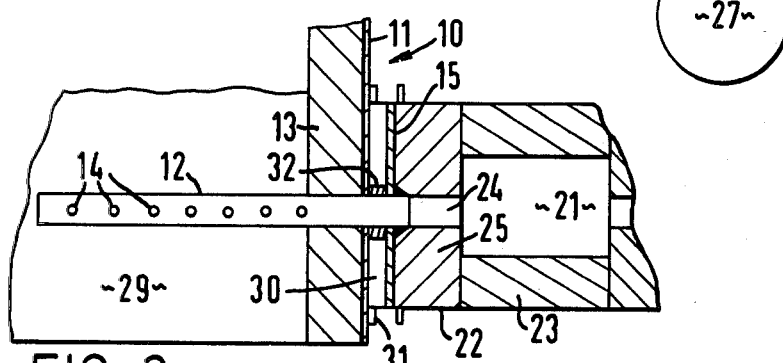
FIG. 2 is a schematic side elevation of a modified form of the arrangement of FIG. 1.

FIG. 2 shows a modified form of the arrangement shown in FIG. 1 but using a water jacket 30 instead of the half-round cooling pipes 16. Water jacket 31 is formed between wall 11 of the container 10 and the tube plate 15. Tube plate 15 extends over the whole height of the refractory block 25 and is spaced from the wall 11. The jacket is closed by flange like extensions 31 to the casing 22 of the plenum chamber 21. Gases enter the channels 24 from the plenum chamber 21 and as with the arrangement of FIG. 1 a cover 25 of the plenum chamber may be removed to enable access to the welds. Around the outermost end of each sparge-tube 11, between the wall 10 and the tube plate 15 a ring 32 is provided to form an entry to the tube plate 15 for each of the sparge-tubes 12. The rings 32 are welded to both the wall 11 and to the tube plate 15 and act as spaces therebetween. The rings are insulated from the bed 29 by refractory wall or plug 10 in the case of flame-tube or shell-boiler. Re-modified form shown in FIG. 2 operates in essentially the same way as that of FIG. 1. Coolant water passing from inlet 17 to outlet 18 through the water jacket 30 to cool the tube plate 15 and the wall 11.

Figure 3:
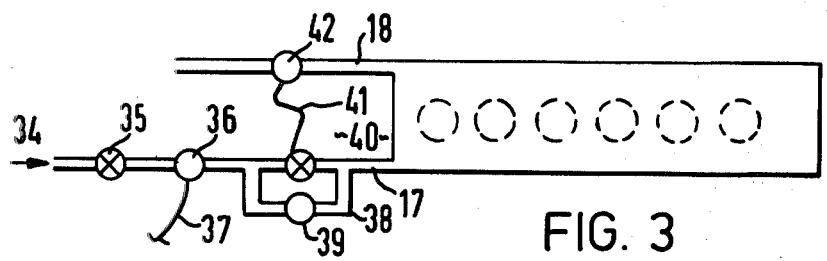
FIG. 3 is a schematic end view (looking in the direction of arrow A of FIG. 1 or 2) of the arrangement of FIG. 1 or 2 diagrammatically illustrating the coolant flow control arrangement.

FIG. 3 schematically illustrates the way of controlling the supply of cooling water to the apparatus arrangement. In the coolant feed line 34 to the inlet 17 there is a stop valve 35 followed by a flow-switch 36 which will operate to terminate operation of the preheat burner 28 (via electrical connector 37) whenever the water flow rate falls below a specified minimum level. To maintain this flow rate in all operating conditions there is a by-pass loop 38 including a stop valve 39 by-passing monitorized valve 40 operable to maintain a constant temperature in the outlet 18 under the control of electrical signals fed to it via a connection 41 from a thermostat 42 in the outlet 18. Valve 40 operates to increase water flow if the outlet coolant temperature rises and to reduce the coolant flow rate when the outlet temperature falls. Local authority regulations make it necessary that the outflow of water from any cooling system does not exceed a given temperature, usually of the order of 60° C., and energy considerations make it desirable that the temperature of the outlet of water should not be significantly less than this temperature.

It will be appreciated that modifications may be made to the above described arrangements without departing from the scope of the present invention. For example the water used to cool the container wall may be recycled to afford some pre-heating to the gases supplied to the plenum chamber.

I claim:

1. A fluidised bed combustion arrangement comprising a container having walls for housing a bed of inert particulate material, at least one supply tube passing into said container through at least one of said walls to extend into said bed of inert particulate material, each said supply tube having apertures formed along the length thereof and having its outermost end coupled to a fluidising gas supply means operable to pass fluidising gas thereto whereby gas from said fluidising gas supply means passes into said container via said supply tubes and passes via said apertures into said bed of inert particulate material to fluidise said bed, the outermost end of each said supply tube being fixed to a wall of the container of the fluidised bed, cooling means mounted in intimate thermal contact with that portion of said wall adjacent the ends of each of said at least one supply tube, said cooling means including a liquid coolant passing therethrough to cool that portion of said wall adjacent the outermost end of said at least one supply tube.

2. The arrangement according to claim 1, including a tube plate through which the outermost end of each supply tube passes, said tube plate being thermally coupled to said wall of the said container and having said outermost end welded thereto, and in which said cooling means is operable to cool the tube plate and/or the tube plate and that portion of said wall thereadjacent.

3. The arrangement according to claim 2 wherein said fluidising gas supply means includes pre-heat means operable to pre-heat fluidising gas passed to said supply tubes, and flow switch means operable to monitor the flow rate of liquid coolant to said apparatus and to prevent operation of said pre-heat means when the rate of flow of liquid coolant falls below a predetermined flow rate.

4. The arrangement according to claim 3 wherein said cooling means includes thermostatically controlled valves operable to control the rate of liquid coolant flow to the apparatus to maintain the temperature of the liquid coolant issuing from said apparatus below a predetermined temperature.

5. The arrangement according to claim 4, wherein said cooling means includes a liquid coolant inlet and a liquid coolant outlet and by-pass valve means interconnecting said inlet and said outlet and operable to maintain a minimum coolant flow rate from the said apparatus.

6. The arrangement according to claim 5, in which said coolant flows along tubes welded to the surface of said tube plate.

7. The arrangement according to claim 6, in which said tubes are semi-circular in section and are welded to said tube plate adjacent the outermost end of each supply tube.

8. The arrangement according to claim 5, in which the tube plate is spaced from said wall, liquid coolant being constrained to pass between said tube plate and said wall around the end of each said supply tube.

9. The arrangement according to claim 8, in which the end portion of the or each supply tube is surrounded by a metal ring welded to both of said wall and said tube plate and acting to space said tube plate from said wall.

10. The arrangement of claim 7 or claim 9, in which said liquid coolant is water.

* * * * *